US009830510B2

(12) United States Patent
Anastassov et al.

(10) Patent No.: US 9,830,510 B2
(45) Date of Patent: Nov. 28, 2017

(54) METHOD AND APPARATUS FOR OBJECT IDENTIFICATION AND LOCATION CORRELATION BASED ON RECEIVED IMAGES

(71) Applicant: HERE Global B.V., Eindhoven (NL)

(72) Inventors: Anton Anastassov, Naperville, IL (US); Gavril Adrian Giurgiu, Chicago, IL (US); Dongwook Jang, Lisle, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/388,333

(22) Filed: Dec. 22, 2016

(65) Prior Publication Data

US 2017/0103259 A1    Apr. 13, 2017

Related U.S. Application Data

(63) Continuation of application No. 14/587,350, filed on Dec. 31, 2014, now Pat. No. 9,569,693.

(51) Int. Cl.
*G06K 9/00* (2006.01)
*G06K 9/62* (2006.01)

(52) U.S. Cl.
CPC ....... *G06K 9/00476* (2013.01); *G06K 9/6215* (2013.01); *G06K 9/6267* (2013.01)

(58) Field of Classification Search
CPC ............. G06T 7/20; G06T 2207/30236; G06T 2207/30248; G06T 2207/30252; G06T 2207/30256; G06T 2207/30261; G06T 2207/30264; G06K 9/00785; G06K 9/0079

See application file for complete search history.

(56) References Cited

U.S. PATENT DOCUMENTS

| 5,311,173 | A  | * | 5/1994 | Komura | G01C 21/30 340/988 |
|---|---|---|---|---|---|
| 6,449,384 | B2 | * | 9/2002 | Laumeyer | G06K 9/00818 382/104 |
| 8,086,071 | B2 |   | 12/2011 | Chen et al. | |
| 2002/0047895 | A1 | * | 4/2002 | Bernardo | G01C 11/02 348/48 |
| 2002/0126913 | A1 | * | 9/2002 | Kotake | G06T 1/20 382/282 |
| 2005/0216186 | A1 | * | 9/2005 | Dorfman | G06F 17/30241 701/408 |
| 2005/0278111 | A1 | * | 12/2005 | Ujino | G01C 21/20 701/440 |
| 2006/0064202 | A1 | * | 3/2006 | Gutmann | G05D 1/0221 700/245 |
| 2006/0271287 | A1 | * | 11/2006 | Gold | G01C 21/26 701/426 |

(Continued)

OTHER PUBLICATIONS

Dissanayake et al ("A solution to the simultaneous localization and map building problem", 2001).*

(Continued)

*Primary Examiner* — Avinash Yentrapati
(74) *Attorney, Agent, or Firm* — Alston & Bird LLP (57) ABSTRACT

A method, apparatus and computer program product are provided for object identification and location correlation based on received images. A method is provided including receiving identity data associated with an object derived from one or more of a plurality of images determining an identity of an object in one or more of the plurality of images, receiving location information associated with a camera which captured the plurality of images, and correlating the identified object with a location for each of the respective images of the plurality of images.

17 Claims, 5 Drawing Sheets

(56) References Cited

U.S. PATENT DOCUMENTS

| | | | | |
|---|---|---|---|---|
| 2007/0136259 A1* | 6/2007 | Dorfman | ................ | G01C 21/26 |
| 2007/0140595 A1* | 6/2007 | Taylor | ................ | G06K 9/00664 |
| | | | | 382/310 |
| 2010/0061591 A1* | 3/2010 | Okada | ...................... | G01C 7/04 |
| | | | | 382/103 |
| 2012/0155744 A1* | 6/2012 | Kennedy | ................ | A63F 13/10 |
| | | | | 382/154 |
| 2012/0209514 A1* | 8/2012 | Chrysanthakopoulos | ................ | |
| | | | | G06K 9/00671 |
| | | | | 701/431 |
| 2013/0030570 A1* | 1/2013 | Shimizu | ................ | B25J 9/1679 |
| | | | | 700/259 |
| 2013/0190981 A1* | 7/2013 | Dolinar | .................. | B60R 11/04 |
| | | | | 701/41 |
| 2013/0223686 A1* | 8/2013 | Shimizu | ................ | G08G 1/166 |
| | | | | 382/103 |
| 2013/0287253 A1* | 10/2013 | Wallace | .................... | G01S 5/16 |
| | | | | 382/103 |
| 2014/0141803 A1* | 5/2014 | Marti | .................... | H04W 4/043 |
| | | | | 455/456.2 |
| 2014/0258201 A1* | 9/2014 | Finlow-Bates | ......... | G01S 19/42 |
| | | | | 706/46 |
| 2015/0304634 A1* | 10/2015 | Karvounis | ............. | G06T 7/277 |
| | | | | 348/46 |

OTHER PUBLICATIONS

Mullane et al ("A random finite set approach to bayesian SLAM", 2011).*

* cited by examiner

METHOD AND APPARATUS FOR OBJECT IDENTIFICATION AND LOCATION CORRELATION BASED ON RECEIVED IMAGES

CROSS-REFERENCE TO RELATED APPLICATIONS

This application is a continuation of U.S. patent application Ser. No. 14/587,350 filed on Dec. 31, 2014, the contents of which are herein incorporated by reference in their entirety.

TECHNOLOGICAL FIELD

An example embodiment of the present invention relates to map rendering and, more particularly, to object identification and location correlation based on images.

BACKGROUND

Current digital maps are typically built and updated using vehicles with expensive, high accuracy sensors, such as light detection and ranging (LIDAR), radar, multiple cameras, accelerometers, or the like. These mapping vehicles may be continuously deployed, driving on roads in order to map new geographical areas and update data for areas that have been previously digitally mapped. However, the road information, e.g. number of lanes, new lanes, closed lanes traffic signs, road surface conditions, or the like, may change faster than the mapping vehicles deployment rate. Therefore, digital maps may suffer from delayed updates.

BRIEF SUMMARY

A method and apparatus are provided in accordance with an example embodiment for object identification and location correlation based on images. In an example embodiment, a method is provided that includes receiving identity data associated with an object derived from one or more of a plurality of images, receiving location information associated a camera which captured the plurality of images, and correlating the identified object with a location for a respective image of the plurality of images.

In an example embodiment, the method also includes determining one or more images of the plurality of images in which the object exits the field of view and correlating the identified object with the location is based on the one or more images in which the object leaves the field of view. In some example embodiments of the method, respective images of the plurality of images include a time stamp and the location information includes a time stamp. The method also includes determining a location of the object based on the time stamp associated with the location information and the time stamp associated with the image.

In some example embodiments of the method, the determining the identity of the object further comprises applying pattern recognition to the image. In an example embodiment, the method also includes determining a portion of the one or more images in which the object exits the field of view and correlating the identified object with the location is further based on the portion of the one or more images in which the object exits the field of view.

In an example embodiment, the method also includes determining a probable object location based on one or more correlated identified object locations. In some example embodiments, the method also includes updating or generating map data associated with the probable location of the object. In an example embodiment, the method also includes, receiving the plurality of images including at least one object and determining an identity of an object in one or more of the plurality of images, In another example embodiment an apparatus is provided including at least one processor and at least one memory including computer program code, with the at least one memory and computer program code configured to, with the processor, cause the apparatus to at least receive identity data associated with an object derived from one or more of a plurality of images, receive location information associated with a camera which captured the plurality of images, and correlate the identified object with a location for a respective image of the plurality of images.

In an example embodiment of the apparatus, the at least one memory and the computer program code are further configured to determine one or more images of the plurality of images in which the object exits the field of view, and correlating the identified object with the location is based on the one or more images in which the object leaves the field of view. In some example embodiments of the apparatus, respective images of the plurality of images include a time stamp and the location information includes a time stamp and the at least one memory and the computer program code are further configured to determine a location of the object based on the time stamp associated with the location information and the time stamp associated with the image.

In some example embodiments of the apparatus, the determining the identity of the object further comprises applying pattern recognition to the image. In an example embodiment of the apparatus, the at least one memory and the computer program code are further configured to determine a portion of the one or more images in which the object exits the field of view and correlating the identified object with the location is further based on the portion of the one or more images in which the object exits the field of view.

In an example embodiment of the apparatus, the at least one memory and the computer program code are further configured to determine a probable object location based on one or more correlated identified object locations. In some example embodiments of the apparatus, the at least one memory and the computer program code are further configured to update or generate map data associated with the probable location of the object. In an example embodiment of the apparatus, the at least one memory and the computer program code are further configured to receive the plurality of images including at least one object and determine an identity of an object in one or more of the plurality of images, In a further example embodiment, a computer program product is provided including at least one non-transitory computer-readable storage medium having computer-executable program code portions stored therein, with the computer-executable program code portions comprising program code instructions configured to receive identity data associated with an object derived from one or more of a plurality of images, receive location information associated with a camera which captured the plurality of images, and correlate the identified object with a location for a respective image of the plurality of images.

In an example embodiment of the computer program product, the computer-executable program code portions further comprise program code instructions configured to determine one or more images of the plurality of images in which the object exits the field of view and correlating the identified object with the location is based on the one or more images in which the object leaves the field of view. In some example embodiments of the computer program product, respective images of the plurality of images include a time stamp and the location information includes a time stamp and the computer-executable program code portions further comprise program code instructions configured to determine a location of the object based on the time stamp associated with the location information and the time stamp associated with the image.

In some example embodiments of the computer program product, the determining the identity of the object further comprises applying pattern recognition to the image. In an example embodiment of the computer program product, the computer-executable program code portions further comprise program code instructions configured to determine a portion of the one or more images in which the object exits the field of view and correlating the identified object with the location is further based on the portion of the one or more images in which the object exits the field of view.

In an example embodiment of the computer program product, the computer-executable program code portions further comprise program code instructions configured to determine a probable object location based on one or more correlated identified object locations. In some example embodiments of the computer program product, the computer-executable program code portions further comprise program code instructions configured to update or generate map data associated with the probable location of the object. In an example embodiment of the computer program product, the computer-executable program code portions further comprise program code instructions configured to receive the plurality of images including at least one object and determine an identity of an object in one or more of the plurality of images In yet a further example embodiment, an apparatus is provided including means for receiving identity data associated with an object derived from one or more of a plurality of images, means for receiving location information associated with a camera which captured the plurality of images, and means for correlating the identified object with a location for a respective image of the plurality of images.

In an example embodiment, the apparatus also includes means for determining one or more images of the plurality of images in which the object exits the field of view and correlating the identified object with the location is based on the one or more images in which the object leaves the field of view. In some example embodiments of the apparatus respective images of the plurality of images include a time stamp and the location information includes a time stamp, wherein the apparatus further comprises means for determining a location of the object based on the time stamp associated with the location information and the time stamp associated with the image.

In an example embodiment of the apparatus the means for determining the identity of the object further comprises means for applying pattern recognition to the image. In some example embodiments, the apparatus also includes means for determining a portion of the one or more images in which the object exits the field of view and correlating the identified object with the location is further based on the portion of the one or more images in which the object exits the field of view.

In some example embodiments, the apparatus also includes means for determining a probable object location based on one or more correlated identified object locations. In an example embodiment, the apparatus also includes means for updating or generating map data associated with the probable location of the object. In some example embodiments, the apparatus also includes means for receiving the plurality of images including at least one object and means for determining an identity of an object in one or more of the plurality of images,

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

Figure 1:
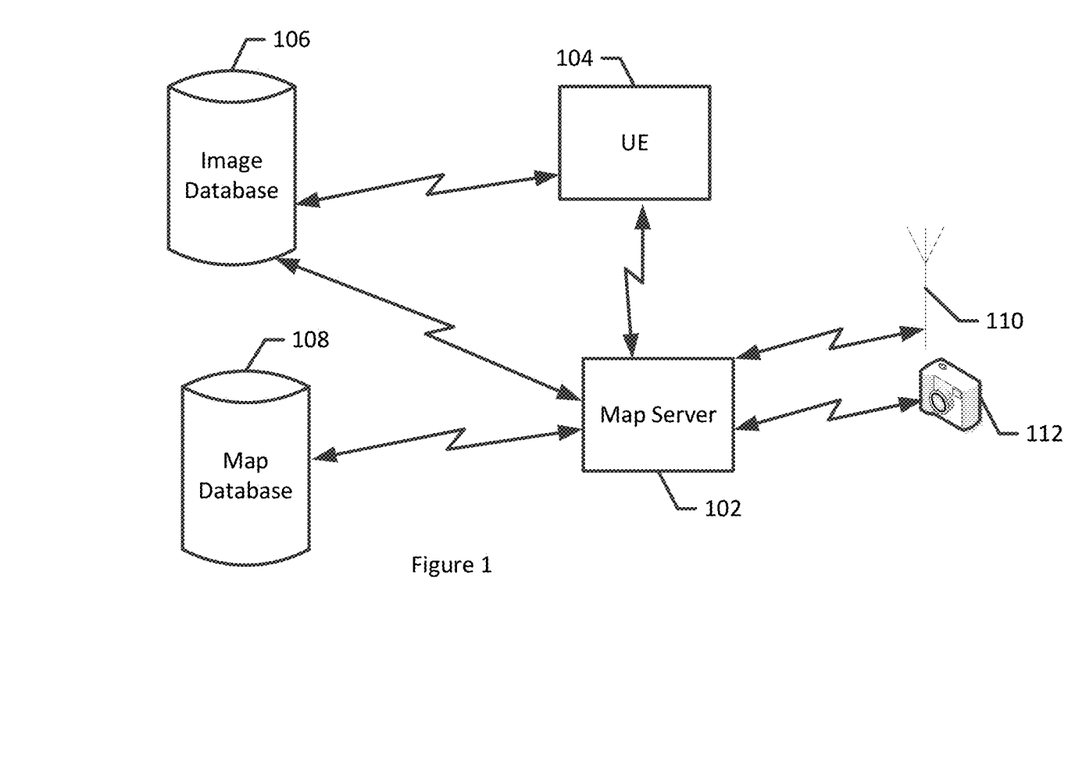
FIG. 1 illustrates a communications diagram in accordance with an example embodiment of the present invention.

A method, apparatus and computer program product are provided in accordance with an example embodiment for object identification and location correlation based on received images. FIG. 1 illustrates a communication diagram including, a map server 102 in data communication with a user equipment (UE) 104, an image database 106, and/or a map database 108. The map server 104 may include the image database 106 and/or the map database 108, such as a map or image data memory, or be associated with the image database 106 and/or the map database 108, such as a remote map or image data server. In some example embodiments, the map server 102 may in communication with one or more location sensors 110 and/or cameras 112. Additionally or alternatively, the UE 104 may be associated with or include the location sensor 110 and/or camera 112. A camera 112 may be any image capturing device for capturing still images, videos, or the like.

The UE 104 may be a mobile computing device such as a laptop computer, tablet computer, mobile phone, smart phone, navigation unit, personal data assistant, or the like. Additionally or alternatively the UE 104 may be a fixed computing device, such as a personal computer, computer workstation, kiosk, office terminal computer or system, or the like. The map server 102 may be one or more fixed or mobile computing devices.

In some embodiments the camera 110 and the location sensor 112 may be associated with a vehicle, such as an automobile, or a pedestrian. The camera 110 may be a fixed image camera a video camera, a radar, or LIDAR capable of generating an image, or the like. The camera 110 may be associated with other sensors, such as accelerometers. In an example embodiment, the camera 110 may be a single front facing camera attached or otherwise mounted or placed on the vehicle or pedestrian. In some example embodiments, the camera 110 and/or the location sensor 112 may be an original equipment manufacturer (OEM) system.

The map server 102 may receive one or more images from the camera 112 or from the image database 106. Additionally or alternatively, the map server 102 or image database 106 may receive the one or more images from a camera 112 associated with the UE 104. The images may be associated with a time stamp indicating the time at which the image was captured. The image may include at least one object, such as a traffic sign, person, vehicle, structure, lane indicator, or the like. The map server 102 may store the one or more images in the image database 106 for later processing or for system analysis.

The map server 102 may receive location information from a location sensor, such as a global position sensor (GPS), proximity sensor, such as radio frequency identification (RFID), or the like, or from the image data base. The location information may be associated with the camera 110 which captured the image. The location data may be associated with a time stamp indicating the time of the location information.

The map server 102 may apply pattern recognition techniques, such as a probabilistic classifier to the one or more images. The pattern recognition may identify one or more objects in the one or more images. For example, the pattern recognition may identify a street sign, a person, a structure, a lane indicator, a vehicle, or the like.

In an example embodiment, an OEM (original equipment manufacturer) server or UE 102 may receive the images and identify objects within the images. The map server 102 may receive identity data associated with an object derived from one or more images.

The map server 102 may correlate location information with an identified object. In an embodiment, the image and location information may be captured at the same time as indicated by the respective time stamps. In an instance in which the time stamps of the image and the location data are not the same, a location may be interpolated.

In an example embodiment, the map server may use location information associated with a time stamp prior to the image time stamp and location information associated with a time stamp after the image time stamp. The map server 102 may determine an interpolated location by averaging of the two locations, e.g. a location halfway between the two locations. In some example embodiments, the map server 102 may determine an interpolated location by using a weighted average of the two locations. For example, if the two location information time stamps are 5 seconds apart and the image time stamp correlates with second 4, the second location would be weighted more heavily than the first location such as by weighting the second location by 80% and the first location by 20%. The determined location may be closer to the second location than the first location.

In an example embodiment in which the camera 110 may be associated with other sensors, such as accelerometers, vehicle speed indicators, or the like, the indications of the rate of travel of the camera 110 may be used to interpolate the location of the camera at the time of capturing the image. For example, if a sensor indicates that the vehicle is traveling at a rate of 60 miles per hour (MPH) and the time stamp associated with the image is approximately 0.5-1 second after the time stamp associated with the location information, the interpolated location may be 1 foot from the location information. In an example embodiment, the interpolated direction of travel may be based on the last two or more location information points, for example the 1 foot would be in the same direction of travel as indicated by the two prior location information points. In some example embodiments, the map server 102 may receive and use map data for location interpolation. The map server 102 may determine a path of travel, such as a road, highway, trail, or the like, and plot the interpolated distance from the last location information received on the determined path.

In an example embodiment, the map server 102 may identify an image from the one or more images in which the identified object leaves the field of view of the image, e.g. an image at which the object is at the edge of the field of view and not in the subsequent image, an image that the object is partially in the field of view of the image and not in the subsequent image, or an image which the object is not present in the field of view of the image, but was present in the previous image. The identified image may be used for correlation of location information to identified objects, since the object is in a known location in the field of view, e.g. corresponding to the exit of the peripheral field of view.

In an example embodiment, the map server 102 may determine the angle of observation for an object in one or more images. The map server 102 may correlate the location information to the identified objects by triangulating or interpolating the object location based on the angle of observation for the one or more images and the location information.

In some example embodiments, the map server 102 may determine the portion of the image at which the identified object exited the field of view, for example top, left, right, bottom, or median positions, such as top left, bottom right, or the like. The map server may determine that the object is above, below, left, or right of the path of travel based on the portion of the image at which the object exits the field of view. For example, the offset may be applied in the direction of travel, or ahead of the location information, in an instance in which the object exits the top or bottom of the image, indicating that the object is above or below the vehicle or pedestrian path. In an instance in which the object exits the right or left of the field of view of the image, the offset may be applied to the left or right respectively of the location information.

The map server 102 may determine a location offset for the identified object. The location offset may be based on the focal length of the image, which may be a standard focal length or reported as a portion of the image. In some embodiments, the offset may be, additionally or alternatively, based on the placement, e.g. height, angle, or the like, of the camera on a vehicle or pedestrian. The location offset may be based, at least in part, on the focal length associated with the edge of the field of view. The portion of the image at which the identified object exits the field of view of the image may influence the direction of the location offset. For example, an offset of 5 feet in front of the camera location may be applied in an instance in which the object exited the field of view in the top middle. In an instance in which the object exited the field of view in the right middle position of the image, the location offset may be 5 feet in front of the camera location and 20 feet to the right of the camera location.

In an example embodiment, the location offset may be a predetermined projection distance, such as 10 feet, 20 feet, 50 feet, or any other distance, from a location plot cluster, discussed below. In an instance in which the offset is a predetermined projection distance, the predetermined projection distance may be a set value for objects identified as left, right, top, e.g. gantry mounted, or the like. For example, in an instance in which there is a median and break down lane, the left predetermined projection distance may be 10 feet, the right predetermined projection distance may be 20 feet, and the top predetermined projection distance may be 30 feet.

In an example embodiment, the map server may correlate the location information to an identified object for each observation, e.g. camera reporting occurrence. The camera reporting occurrences may be associated with a single camera 110 at different reporting occurrences, such as different days, hours apart, or the like, or associated with two or more cameras. The map server 102 may correlate an identified object with a location, by plotting an object location on a map, based on each of the camera reporting occurrences. In an example embodiment, the map server 102 may utilize map information and travel path information associated with the camera 110 to clarify plot locations occurring in intersections, or other complex topologies. For example, the map server may plot objects on the side of a road rather than in the middle of the road.

The map server 102 may determine the location of the identified object based on the plotted locations of the identified object. The map server 102 may determine the identified object probable location based on cluster analysis of the plotted location of the object on one or more maps received from the map database 108. In an example embodiment, the map server 102 may apply a density based cluster algorithm to plots of the identifier object to determine the location, e.g. probable location, of the object.

In an example embodiment, the map server 102 may determine the probable location of the identified object using a derived probability density function corresponding to a single observation, e.g. image from a single vehicle for a single pass of the vehicle by a sign. In some example embodiments, the map server 102 may have multiple observations, e.g. images, such as from several vehicles or several passes by the object location, and the map server 102 may generate a combined probability density for the object. The map server 102 may refine the probability density by performing a time dependent determination based on images in which the object is observed, and drives of vehicles by the same location where the object is not observed, which may account for newly added or removed objects. The map server 102 may determine the probable object location in an instance in which the combined probability density at that location satisfies a predetermined threshold.

The map server 102 may generate map data associated with the object based on the probable location. For example, the map server 102 may plot the probable location of the object on a highway map, trail map, or the like.

In some example embodiments, object changes may be determined and map data updated accordingly. For example, additional objects, removed objects, changes to an object, such as change of speed limit on a traffic sign, or the like. In an example embodiment, updates to changed objects may be time dependent. The time interval sensitivity may depend on the amount of available camera reporting occurrences, which may be a function of the frequency of traffic in the geographic area under investigation and the fraction of vehicles or pedestrians equipped with a camera 110 and location sensor 112. The camera reporting occurrences may be approximately the same for a given geographic area from day to day. Fluctuations due to weekend traffic or holidays may be controlled by removal or adjusting the weight of data collected during these periods. The variation in camera reporting occurrences from day to day may be controlled by a Pission distribution with a standard deviation given by the square root of the expected number of camera reporting occurrences. In an instance in which an expected value is not determined, an observed average may be used. For example, assuming 100 vehicles equipped with a camera 110 and location sensor 112 observe and report a specific traffic speed sign in a certain day, and assuming that the average number of camera reporting occurrences is approximately 100, the standard deviation would be 10 camera reporting occurrences. A new sign may be plotted, a sign removed or changed, in an instance in which a significant cluster is different than the object data present in previous maps, e.g. 11 or more camera reporting occurrences in the previous example.

In an example embodiment, the map server may determine an object placement efficiency. The object placement efficiency may be the number of identified objects within a predetermined radius of the true location of the object, such as 100 meters, 20 meters, or the like, divided by the total number of identifiable objects. The actual position or true position of the identified object may be entered by a user or determined by precision maps.

The map server 102 may cause the updated map to be stored in the map database 108 and/or cause the updated map data to be transmitted to a UE 104 to be displayed on a user interface. For example, the map may be displayed for navigational and traffic purposes.

Example Apparatus

Figure 2:
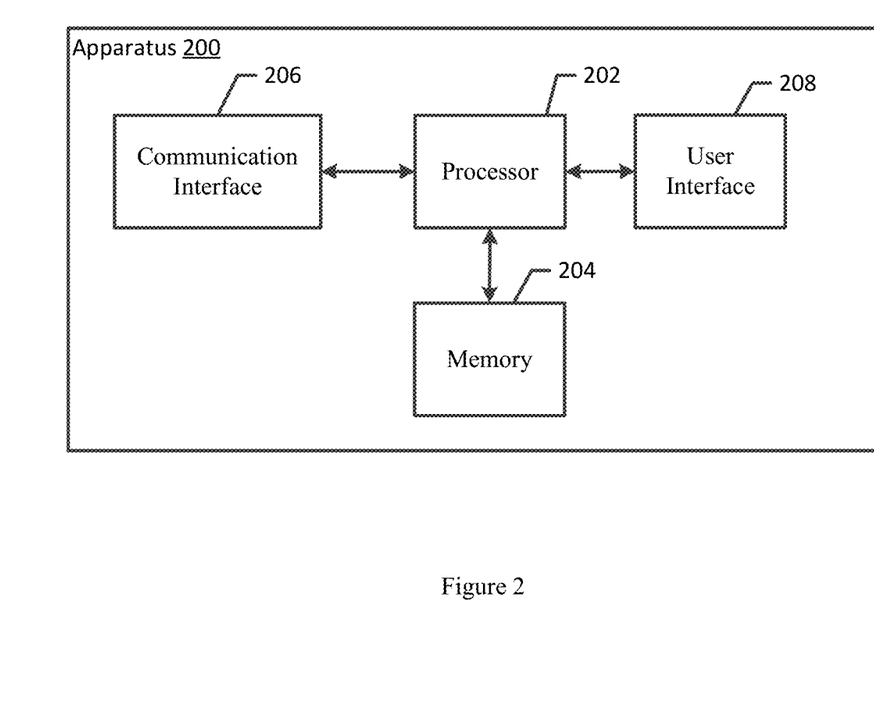
FIG. 2 is a block diagram of an apparatus that may be specifically configured for object identification and location correlation based on received images in accordance with an example embodiment of the present invention.

A map server 102 may include or otherwise be associated with an apparatus 200 as shown in FIG. 2. The apparatus, such as that shown in FIG. 2, is specifically configured in accordance with an example embodiment of the present invention for object identification and location correlation based on images. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by map server 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data from/to a communications device in communication with the apparatus, such as to facilitate communications with one or more user equipment 110, utility device, or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example Object Location Cluster Plot

Figure 3:
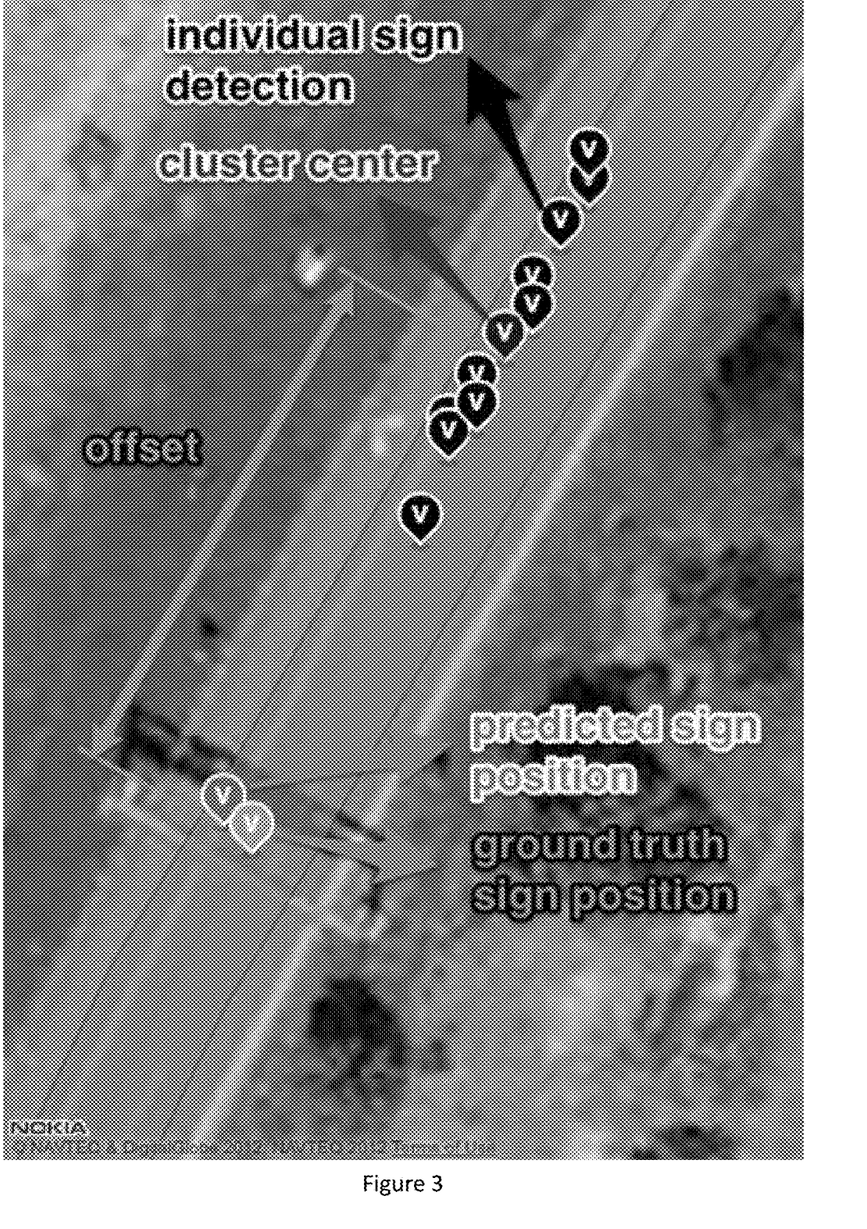
FIG. 3 illustrates an example object location cluster plot in accordance with an example embodiment of the present invention.

FIG. 3 illustrates an example object location cluster plot in accordance with an example embodiment of the present invention. The cluster plot is depicted on an aerial image of the geographical location analyzed. The cluster plot is generated based on identification of a gantry traffic sign, as identified by the "true position" in the location cluster plot. Each of the dots depicted indicates a camera reporting occurrence correlated location, e.g. position, in which the gantry traffic sign was identified. A cluster center location is identified and a location offset applied resulting in the determined probable location, e.g. predicted position, of the gantry traffic sign. As depicted, the true position of the gantry traffic sign and the probable location are negligibly different.

Example Correlated Location of an Object Results

Figure 4:
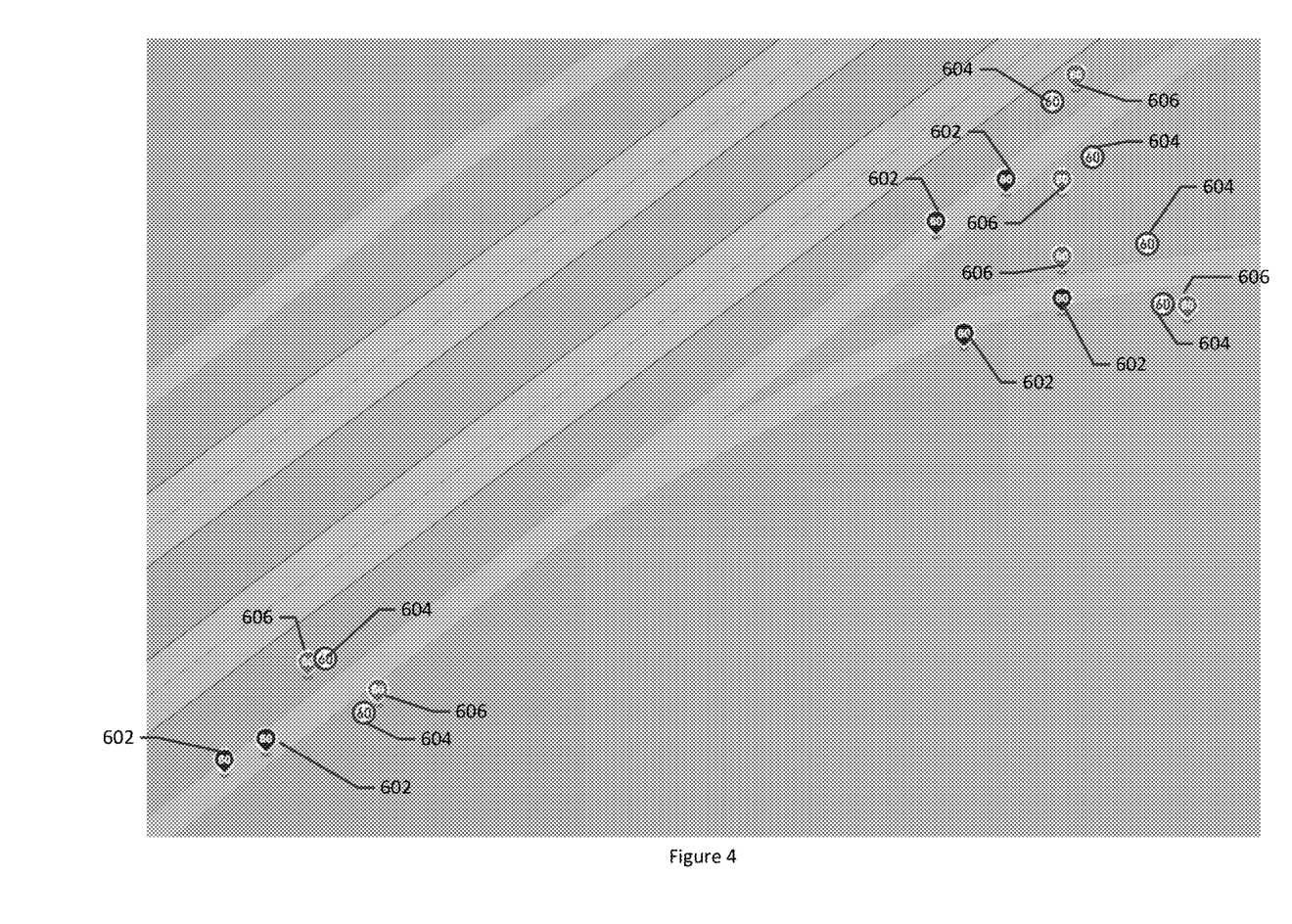
FIG. 4 illustrates an example correlated location of object results in accordance with an embodiment of the present invention.

FIG. 4 illustrates an example correlated location of object results in accordance with an embodiment of the present invention. The correlated location of the object results are overlaid on an aerial image to provide context. The correlated location of the object results include the location plot cluster centers 602, the probable locations 606 and the actual locations 604.

Figure 5:
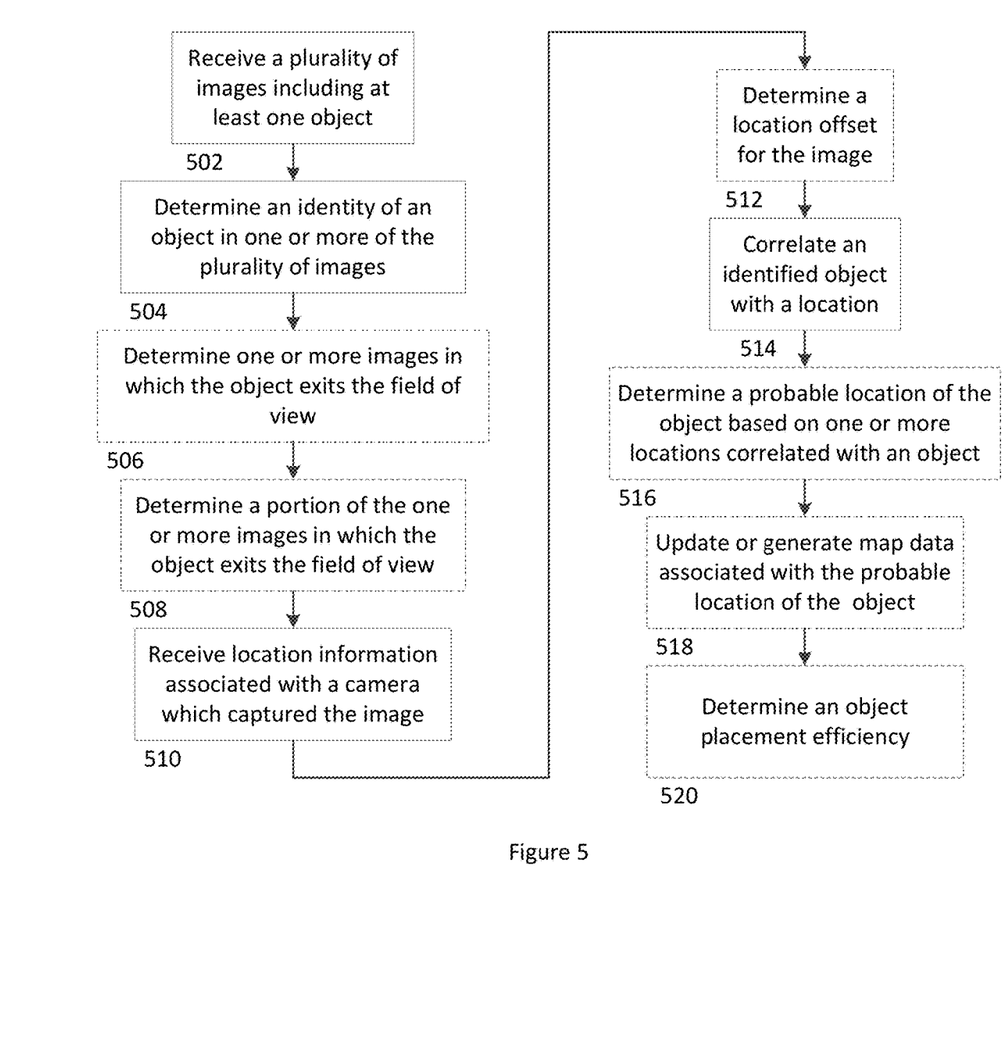
FIG. 5 illustrates an example process for object identification and location correlation based on received images in accordance with an embodiment of the present invention.

Example Process for Object Identification and Location Correlation Based on Received Images Referring now to FIG. 5, the operations performed, such as by the apparatus 200 of FIG. 2, for object identification and location correlation based on received images are illustrated. As shown in block 502 of FIG. 5, the apparatus 200 may include means, such as a processor 202, memory 204, a communications interface 206, or the like, configured to receive a plurality of images including at least one object. The processor 202 may receive the plurality of images from a camera, such as camera 110, a UE, such as UE 104, associated with a camera, or a memory 204, such as image database 106. The plurality of images may be still images, video images, radar images, LIDAR images, or the like. The object may be a traffic sign, structure, person, vehicle, lane indicator, or the like. The respective images of the plurality of images may include a time stamp indicating the time the image was generated or captured.

As shown in block 504 of FIG. 5, the apparatus 200 may include means, such as a processor 202, or the like, configured to determine the identity of an object in one or more of the plurality of images. The processor 202 may apply pattern recognition, such as a probabilistic classifier, or the like to identify objects in the plurality of images.

In an example embodiment, blocks 502 and 504 may be performed by an OEM server or UE, such as UE 102. In an instance in which the OEM server performs blocks 502 and 504, the processor 202 may receive identity data associated with an object derived from one or more of the plurality of images. The processor may receive the identity data from a communications interface 206, which in turn, receives the identity information from the OEM server.

As shown at block 506, of FIG. 5, the apparatus 200 may include means, such as a processor 202, or the like, configured to determine one or more images in which the object exits the field of view. An image in which the object exits the field of view may include without limitation; an image at which the object is at the edge of the field of view and not in the subsequent image, an image that the object is partially in the field of view of the image and not in the subsequent image, or an image in which the object is not present in the field of view of the image, but was present in the previous image.

As shown at block 508 of FIG. 5, the apparatus 200 may include means, such as a processor 202, or the like, configured to determine a portion of the one or more images in which the object exits the field of view. The processor 202 may determine that the object exits the field of view by side portion, such as top, left, right, or bottom, or sub-portions, such as top left or top middle.

As shown at block 510 of FIG. 5, the apparatus 200 may include means, such as a processor 202, communications interface 106, or the like, configured to receive location information associated with a camera which captured the image. The processor 202 may receive the location information from the communications interface 106, which may in turn receive the location information from a location sensor, such as location sensor 112, a UE 102 associated with a location sensor, or a camera 110 associated with the location sensor. The location information may be a GPS position or a proximity to a location. The location information may include a time stamp indicating the time the location information was generated or captured.

As shown at block 512 of FIG. 5, the apparatus 200 may include means, such as a processor 202, or the like, configured to determine a location offset for the object. The location offset may be based on the focal length of the image, which may be a standard focal length or reported as a portion of the image. In some embodiments, the offset may be, additionally or alternatively, based on the placement, e.g. height, angle, or the like, of the camera on a vehicle or pedestrian. The location offset may be based, at least in part, on the focal length associated with the edge of the field of view of an image. In some example embodiments, the portion of the image at which the identified object leaves the field of view of the image may influence the direction of the location offset.

In an example embodiment, the location offset may be a predetermined projection distance, such as 10 feet, 20 feet, 50 feet, or any other distance, from a location plot cluster, discussed at block 516. In an instance in which the offset is a predetermined projection distance, the predetermined projection distance may be a set value objects identified as left, right, top, e.g. gantry mounted, or the like. For example, in an instance in which there is a median and break down lane, the left predetermined projection distance may be 10 feet, the right predetermined projection distance may be 20 feet, and the top predetermined projection distance may be 30 feet.

As shown at block 514 of FIG. 5, the apparatus 200 may include means, such as a processor 202, or the like, configured to correlate an identified object with a location. The processor 202 may correlate the identified object to a location associated with a map. The location may be the location associated with the camera at the time of image capture, such as in instance in which the time stamp associated with the image is the same or negligibly different than the time stamp associated with location information.

In an instance in which the time stamp associated with the image and the time stamp associated with the location information are different, the processor 202 may interpolate the location of the camera at the time the image was captured. The camera 110 may be associated with other sensors, such as accelerometers, vehicle speed indicators, or the like, and the indications of the rate of travel of the camera 110 may be used to interpolate the location of the camera at the time of capturing the image. For example, if a sensor indicates that the vehicle is traveling at a rate or 60 miles per hour (MPH) and the time stamp associated with the image is approximately 1 0.5-1 second after the time stamp associated with the location information, the interpolated location may be 1 foot from the location information. In an example embodiment, the interpolated direction of travel may be based on the last two or more location information points, for example the 1 foot would be in the same direction of travel as indicated by the two prior location information points. In some example embodiments, the processor 202 may receive and use map data, from a memory 204, such as map database 108, for location interpolation. The processor 202 may determine a path of travel, such as a road, highway, trail, or the like, and plot the interpolated distance from the last location information received on the determined path.

In some example embodiments, the processor 202 may apply the location offset to the location, for example the distance in front of the camera the object is likely to be based on focal length, mounting angle, mounting height or the like. Additionally or alternatively, the processor may apply a location offset based on the portion of the image in which the object exits the field of view. In an instance in which the object exits the image field of view at the top middle the offset may be 5 feet in front of the camera location. In an instance in which the object leaves the image field of view at the left middle, the offset may be 20 feet to the left and 5 feet in front of the camera location.

In an example embodiment, the processor 202 may determine the angle of observation for an object in one or more images. The processor 202 may correlate the location information to the identified objects by triangulating or interpolating the object location based on the angle of observation for the one or more images and the location information.

As shown at block 516 of FIG. 5, the apparatus 200 may include means, such as a processor 202, memory 204, or the like, configured to determine a probable location of the object based on one or more locations correlated with an object. The processor 202 may determine the probable location of the identified object based on cluster analysis of the correlated, e.g. plotted, location of the object on one or more maps received from a memory 204, such as map database 108. In an example embodiment, the map server 102 may apply a density based cluster algorithm to plots of the identified object to determine the probable location of the identified object.

In an example embodiment, the processor 202 may determine the probable location of the identified object using a derived probability density function corresponding to a single observation, e.g. image from a single vehicle for a single pass of the vehicle by a sign. In some example embodiments, the processor 202 may have multiple observations, e.g. images, such as from several vehicles or several passes by the object location, and the map server 102 may generate a combined probability density for the object. The processor 202 may refine the probability density by performing a time dependent determination based on images in which the object is observed, and drives of vehicles by the same location where the object is not observed, which may account for newly added or removed objects. The processor 202 may determine the probable object location in an instance in which the combined probability density at that location satisfies a predetermined threshold.

In an example embodiment, the processor 202 may determine the probable location by applying the predetermined projection distance location offset to the plotted location cluster center.

As shown in block 518 of FIG. 5, the apparatus 200 may include means, such as a processor 202, or the like, configured to update or generate map data associated with probable location of the object. The processor 202 may generate map data for an identified object by associating the object with the probable location on a map. In an instance in which the object exists on the map, the processor 202 may update the map data by updating the identified object location with the probable location.

As shown in block 520 of FIG. 5, the apparatus 200 may include means, such as a processor 202, a user interface 208, or the like, configured to determine an object placement efficiency. The object placement efficiency may be the number of identified objects within a predetermined radius of the true location of the object, which may be entered by a user on a user interface 208 or determined by precision maps, divided by the total number of identifiable objects.

In some example embodiments, the processor 202 may cause the map data to be stored in the memory, e.g. map database 108 and/or cause the communications interface 206, to cause the map data to be transmitted to a UE 104 to be displayed on a user interface. For example, the map may be displayed for navigational and traffic purposes.

Crowd sourcing object location information from vehicle and pedestrian cameras and sensors may allow for the map server to receive millions of observations, e.g. camera reporting occurrences. These camera reporting occurrences may be used to determine accurate locations of objects as quickly as they are reported. Generating or updating object locations based on vehicle sensor information may allow for maps to be updated for new objects or changed objects more quickly and efficiently than the current mapping vehicle deployment methods. In some examples, the map data may be updated in real time or near real time.

As described above, FIG. 5 illustrates a flowchart of an apparatus 200, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of block 506, 508, 510, 512, 516, 518, and 520 in FIG. 5. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    receiving identity data associated with an object derived from at least one image of a sequence of two or more images;
    receiving location information associated with a camera which captured the sequence of images;
    correlating the object with a location for a respective image of the sequence of images;
    establishing a location of the object from the location of the respective image and the location information associated with the camera which captured the image;
    generating a probability density associated with the location of the object;
    plotting the location of the object on a map in an instance in which the probability density satisfies a predetermined threshold; and
    determining an object placement efficiency based on a number of objects within a predetermined radius of a true location of the object and a total number of objects.

2. The method of claim 1, wherein respective images of the sequence of images are associated with a time stamp and the location information associated with the camera is associated with a time stamp, wherein the method further comprises:
    determining a location of the object based on the time stamp associated with the location information and the time stamp associated with a respective image.

3. The method of claim 1, further comprising determining the identity of the object by applying pattern recognition to the at least one image.

4. The method of claim 1, wherein receiving location information associated with a camera which captured the sequence of images comprises receiving location information and speed of travel information associated with the camera which captured the sequence of images, wherein correlating the object with a location for a respective image of the sequence of images comprises correlating the object with a location based on an interpolation between the sequence of images using the speed of travel information.

5. The method of claim 1 wherein establishing a location of the object from the location of the respective image and the location information associated with the camera which captured the image comprises:
    identifying an image from the sequence of images in which the object is determined to be exiting a field of view; and
    establishing the location of the object based on the location in the field of view corresponding to the exit of a peripheral field of view of the camera.

6. The method of claim 5, wherein identifying the image from the sequence of images in which the object is determined to be exiting the field of view comprises:
    identifying a sequential pair of images in which the object appears at least in part in a first image of the pair of images and the object does not appear in a second image of the pair of images; and
    establishing the first image as the image from the sequence of images in which the object is exiting the field of view.

7. An apparatus comprising at least one processor and at least one memory including computer program code, the at least one memory and computer program code configured to, with the processor, cause the apparatus to at least:
    receive identity data associated with an object derived from at least one image of a sequence of two or more images;
    receive location information associated with a camera which captured the sequence of images;
    correlate the object with a location for a respective image of the sequence of images;
    establish a location of the object from the location of the respective image and the location information associated with the camera which captured the image;
    generate a probability density associated with the location of the object;
    plot the location of the object on a map in an instance in which the probability density satisfies a predetermined threshold; and
    determine an object placement efficiency based on a number of objects within a predetermined radius of a true location of the object and a total number of objects.

8. The apparatus of claim 7, wherein respective images of the sequence of images are associated with a time stamp and the location information associated with the camera is associated with a time stamp, wherein the apparatus is further caused to:
    determine a location of the object based on the time stamp associated with the location information and the time stamp associated with a respective image.

9. The apparatus of claim 7, wherein the apparatus is further caused to determine the identity of the object by applying pattern recognition to the at least one image.

10. The apparatus of claim 7, wherein causing the apparatus to receive location information associated with a camera which captured the sequence of images comprises causing the apparatus to receive location information and speed of travel information associated with the camera which captured the sequence of images, wherein causing the apparatus to correlate the object with a location for a respective image of the sequence of images comprises causing the apparatus to correlate the object with a location based on an interpolation between the sequence of images using the speed of travel information.

11. The apparatus of claim 7 wherein causing the apparatus to establish a location of the object from the location of the respective image and the location information associated with the camera which captured the image comprises causing the apparatus to:
identify an image from the sequence of images in which the object is determined to be exiting a field of view; and
establish the location of the object based on the location in the field of view corresponding to the exit of a peripheral field of view of the camera.

12. The apparatus of claim 11, wherein causing the apparatus to identify the image from the sequence of images in which the object is determined to be exiting the field of view comprises causing the apparatus to:
identify a sequential pair of images in which the object appears at least in part in a first image of the pair of images and the object does not appear in a second image of the pair of images; and
establish the first image as the image from the sequence of images in which the object is exiting the field of view.

13. A computer program product comprising at least one non-transitory computer-readable storage medium having computer-executable program code portions stored therein, the computer-executable program code portions comprising program code instructions configured to:
receive identity data associated with an object derived from at least one image of a sequence of two or more images;
receive location information associated with a camera which captured the sequence of images;
correlate the object with a location for a respective image of the sequence of images;
establish a location of the object from the location of the respective image and the location information associated with the camera which captured the image;
generate a probability density associated with the location of the object;
plot the location of the object on a map in an instance in which the probability density satisfies a predetermined threshold; and
determine an object placement efficiency based on a number of objects within a predetermined radius of a true location of the object and a total number of objects.

14. The computer program product of claim 13, wherein the respective images of the sequence of images are associated with a time stamp and the location information associated with the camera is associated with a time stamp, wherein the program code instructions are further configured to:
determine a location of the object based on the time stamp associated with the location information and the time stamp associated with a respective image.

15. The computer program product of claim 13, further comprising program code instructions configured to determine the identity of the object by applying pattern recognition to the at least one image.

16. The computer program product of claim 13, wherein the program code instructions configured to receive location information associated with a camera which captured the sequence of images comprises program code instructions configured to receive location information and speed of travel information associated with the camera which captured the sequence of images, wherein the program code instructions configured to correlate the object with a location for a respective image of the sequence of images comprises program code instructions configured to correlate the object with a location based on an interpolation between the sequence of images using the speed of travel information.

17. The computer program product of claim 13 wherein the program code instructions configured to establish a location of the object from the location of the respective image and the location information associated with the camera which captured the image comprises program code instructions configured to:
identify an image from the sequence of images in which the object is determined to be exiting a field of view; and
establish the location of the object based on the location in the field of view corresponding to the exit of a peripheral field of view of the camera.

* * * * *